United States Patent [19]
Jacobs et al.

[11] Patent Number: 5,957,516
[45] Date of Patent: Sep. 28, 1999

[54] SHOCK-ABSORBING TOOL HANDLE

[75] Inventors: Paul J. Jacobs, Arlington, Mass.;
Ronald J. Shaud, Reading, Pa.

[73] Assignee: Nor'Easter Enterprises, Inc.,
Somerville, Mass.

[21] Appl. No.: 09/058,030

[22] Filed: Apr. 10, 1998

Related U.S. Application Data

[63] Continuation-in-part of application No. 08/727,024, Oct. 8, 1996, Pat. No. 5,816,634, which is a continuation-in-part of application No. 08/640,986, Apr. 19, 1996, Pat. No. 5,690,374.

[51] Int. Cl.⁶ .................................................. B25G 1/04
[52] U.S. Cl. ........................................................... 294/57
[58] Field of Search .......................... 294/19.1, 49, 53.5, 294/54.5, 57–59; 15/144.4; 16/110 R, 111 R, 111 A, 114 R, 115; 37/265, 278, 284, 285; 81/177.2; 173/211; 267/71, 136, 137, 174; 403/229, 345

[56] References Cited

U.S. PATENT DOCUMENTS

| | | |
|---|---|---|
| 1,294,304 | 2/1919 | Pittman ................................. 294/57 X |
| 1,407,237 | 2/1922 | Thompson et al. ........................ 294/57 |
| 2,572,230 | 10/1951 | Williams ................................. 294/53.5 |
| 2,793,902 | 5/1957 | Govan ........................................ 294/57 |
| 3,993,340 | 11/1976 | Rusing et al. .......................... 294/53.5 |
| 4,615,553 | 10/1986 | Hultine ....................................... 294/58 |
| 5,690,374 | 11/1997 | Jacobs et al. ............................. 294/57 |

FOREIGN PATENT DOCUMENTS

| | | | |
|---|---|---|---|
| 37766 | 8/1927 | Denmark ................................. 294/57 |
| 2334475 | 8/1977 | France ..................................... 294/57 |
| 1423159 | 1/1976 | United Kingdom .................... 294/57 |

*Primary Examiner*—Johnny D. Cherry
*Attorney, Agent, or Firm*—Hamilton, Brook, Smith & Reynolds, P.C.

[57] ABSTRACT

A shock-absorbing telescoping tool handle is disclosed having a larger diameter proximal portion and a smaller diameter distal portion. An internal spring in the handle portions is compressed when the handle portions telescope towards each other upon shock being applied to the tool handle. Guide mechanisms in the handle portion limit the extent of sliding motion between the handle portion and prevent relative motion of the handle portions. One or more wipers in the handle portion wipes away any snow, water or debris on the distal portion which could potentially enter the spring area. The spring may be located within the proximal portion or the distal portion of the tool handle.

10 Claims, 4 Drawing Sheets

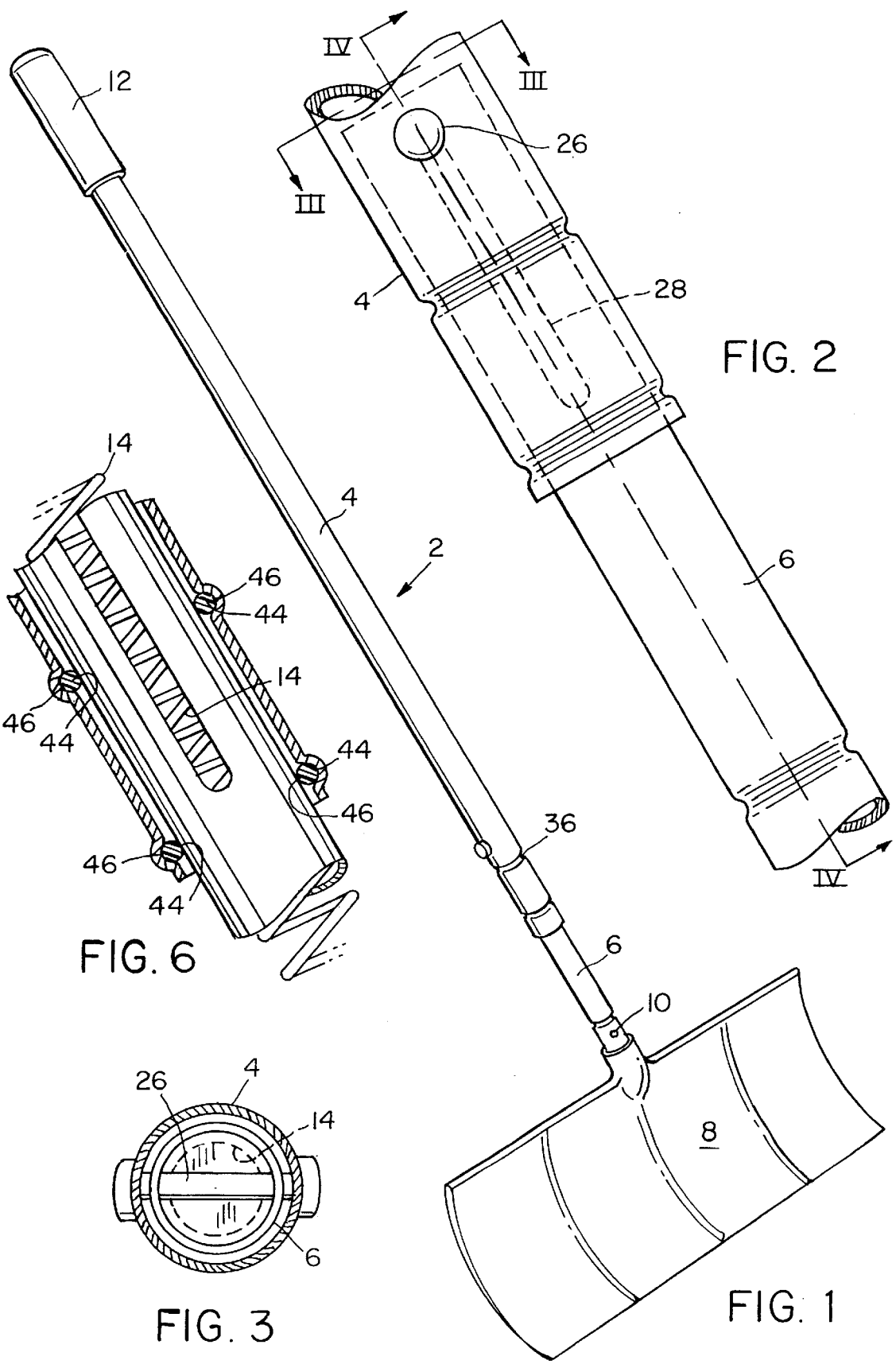

SHOCK-ABSORBING TOOL HANDLE

RELATED APPLICATIONS

This is a continuation-in-part of U.S. application Ser. No. 08/727,024 filed Oct. 8, 1996, now U.S. Pat. No. 5,816,634, which is a continuation-in-part of U.S. application Ser. No. 08/640,986 filed Apr. 19, 1996, now U.S. Pat. No. 5,690,374, in the names of Paul J. Jacobs, et al..

BACKGROUND OF THE INVENTION

This invention relates to shock-absorbing tool handles in general and, more specifically, to handles for shovels, spades, ice choppers, snow pushers and the like.

U.S. Pat. No. 4,691,954 to Shaud discloses a shock-absorbing tool handle for a snow shovel. The Shaud handle has two parts or portions which telescope together and one part is joined to a detachable blade. Within the handle is a spring which compresses when the handle parts telescope together under axial load or shock imparted from the blade striking an object hidden, for example, by the snow. The compression of the spring reduces the shock impact to the user.

In the Shaud device, the handle parts are both tubular and the blade is attached to the distal part or portion in conventional fashion, the proximal portion being the end which is gripped by the user. The proximal portion is narrower in diameter than the distal portion and slides into the larger distal tube. At the intersection of the two handle portions, water, snow and other debris can flow downwardly into the larger diameter distal tube and, if allowed to collect, adds weight to the shovel, it could freeze or otherwise trap debris within the handle. With time, the spring could rust and other internal parts as well. It is, accordingly, an object of this invention to provide a shock-absorbing tool handle which is not susceptible to the collection of snow, water or other debris inside the handle.

SUMMARY OF THE INVENTION

The invention resides in a shock-absorbing tool handle comprising a tubular proximal portion or proximal tube and a tubular distal portion or distal tube. The distal portion is formed or adapted to receive a tool such as the blade of a snow shovel or a spade. The proximal portion is larger in cross-section than the distal portion and slides over the distal portion in telescoping relationship. The handle portions telescope axially toward each other when, for example, the blade or other tool meets resistance such as a ridge in a sidewalk being shoveled or a rock or any other hard object. An internal spring is located between the handle portions and is maintained between keepers located within the respective handle portions. Guide mechanism is located in the handle portions to limit the amount of sliding motion and to permit the spring to be compressed between the keepers when axial shock is applied to the blade. The guide mechanism also serves to prevent relative rotation of the handle portions.

There is at least one annular wiper in the proximal portion surrounding the distal portion to prevent the entry of contaminants between the telescoping portions in the area of the spring and to wipe contaminants from the distal portion when the handle telescopes.

The wipers may take the form of an annular indentation in the proximal member creating an inwardly extending annular bulge engagable with the outer diameter of the distal tube. The wipers also serve to add axial rigidity or integrity to the handle member.

The wipers may be annular or o-ring like members retained in an annular recess in the proximal portion of the handle and made of low friction plastic material slidable on the outer diameter of the distal tube or portion.

One of the spring keepers comprises a constriction in one of the handle portions supporting a washer and is illustrated as being located in the distal portion. Another spring keeper comprises a washer abutting a pin extending transversely of one of the portions herein illustrated as being the proximal portion. The guide comprises aligned slots on opposite sides of the distal portion through which the pin extends.

An alternative form of spring keeper comprises a dowel firmly embedded in the distal tube against which the spring abuts. Optionally, a washer may separate the dowel from the spring.

The tool, such as a snow blade, provided with an annular hub may be secured by screws passing through the distal tube into the dowel.

The above and other features of the invention including various and novel details of construction and combination of parts will now be more particularly described with reference to the accompanying drawings and pointed out in the claims. It will be understood that the particular shock-absorbing tool handle embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 1 is a perspective view of a snow shovel embodying the present invention.

FIG. 2 is a portion of the handle of FIG. 1 at the intersection of the proximal and distal portions.

FIG. 3 is a sectional view of the spring keeper taken along the line III—III on FIG. 2.

FIG. 6 is a sectional view similar to FIGS. 4 and 5 disclosing a second embodiment of the invention.

DETAILED DESCRIPTION OF THE INVENTION

Figure 4:
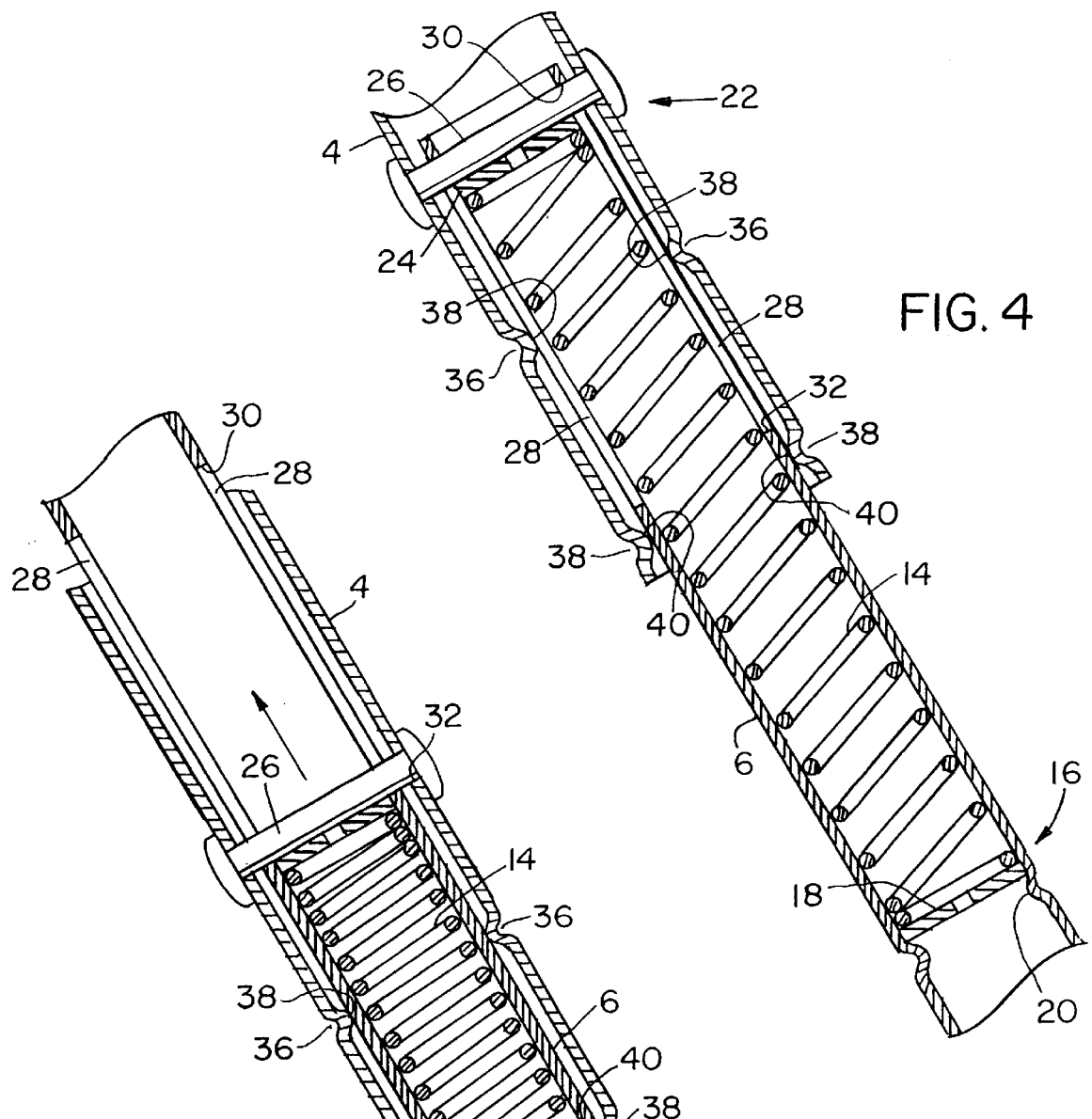
FIG. 4 is a sectional view taken along the line IV—IV on FIG. 2 with the spring in the expanded condition.

The handle, generally designated 2, comprises a proximal portion 4 and a distal portion 6. The distal portion is adapted to receive a tool such as a snow blade 8. The tool also may be a spade, ice chopper, pitchfork, snow pusher or any other equivalent tool. The handle may be of any length. The blade may be attached by any convenient means such as a pin 10. The proximal portion of the handle 4 is shown mounting an optional hand grip 12. Both portions are tubular and the proximal portion 4 is larger in cross-section than the distal portion and slidable over the distal portion in telescoping relationship. A spring 14 is contained within the handle portions and is compressible when the portions telescope toward each other. It is illustrated as being in the distal portion. A first spring keeper, best seen in FIG. 4, generally designated 16 in the distal portion of the handle, comprises a washer 18 which abuts an annular inwardly extending rib or constriction 20, formed by creating an annular indentation in the distal portion. A second spring keeper, generally designated 22, comprises a washer 24 abutting a pin 26 which passes through the proximal tubular portion 4 and is slidably received in diametrically opposed slots 28 formed in the tubular distal portion 6.

Figure 5:
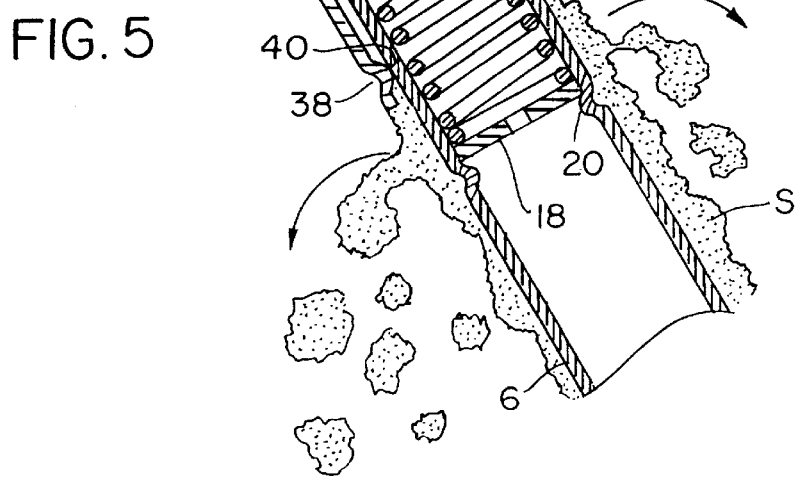
FIG. 5 is a view similar to FIG. 4 with the spring in compressed position.

Before the spring 14 is compressed by axial force, that is, when it is moved from the FIG. 4 to the FIG. 5 position, the pin normally resides at the top 30 of the slot 28 since the spring is under a small amount of compression when assembled. However, when the distal portion 6 of the handle strikes a hard object or is otherwise compressed, it moves from the FIG. 4 to the FIG. 5 position by sliding into the proximal portion until the pin 26 abuts the bottom 32 of the slots 28

The slot 28 serves an additional function of preventing relative rotation between the proximal and distal portions of the handle. The pin 26 is fixed in the proximal portion 4 and at all times is engagable with one or the other of the sidewalls of the slot limiting rotation to no more than the clearance between the pin 26 and the slots 28.

Even though the proximal portion 4 of the handle is larger in diameter and telescopes over the distal portion 6 and helps to prevent the entry of snow, water and debris into the area of the opening, at least one wiper 40 is provided in the handle to affirmatively wipe away the snow S. Whereas only one wiper is necessary, two wipers are shown. Each wiper comprises an inwardly facing annular projection or bulge 40 formed by annularly indenting the proximal tube 4 at 36 and 38. The wipers have essentially the same, but fractionally larger, diameter than the outer diameter of the inner distal member 6. Upon compression, the wipers move downwardly of the distal portion with the annular bulges 40 wiping snow S and debris from the distal portion 6 as seen in FIG. 5. The wipers also prevent snow, debris and water from reaching the spring 14. The wipers also serve the function of adding stability and axial integrity to the proximal and distal portions 4 and 6.

FIG. 6 shows an alternative form comprising annular O-ring like members 44 retained and carried in annular, outwardly extending, retaining recesses 46 in the proximal portion 4 of the handle. The O-rings may be made of low friction plastic material such as Delrin™ or the like. Other possible materials for the wipers could be felt, for example, secured in the proximal portion 4 and engagable with the distal portion 6 of the handle to wipe snow, rain and debris from the exposed distal portion.

Figure 7:
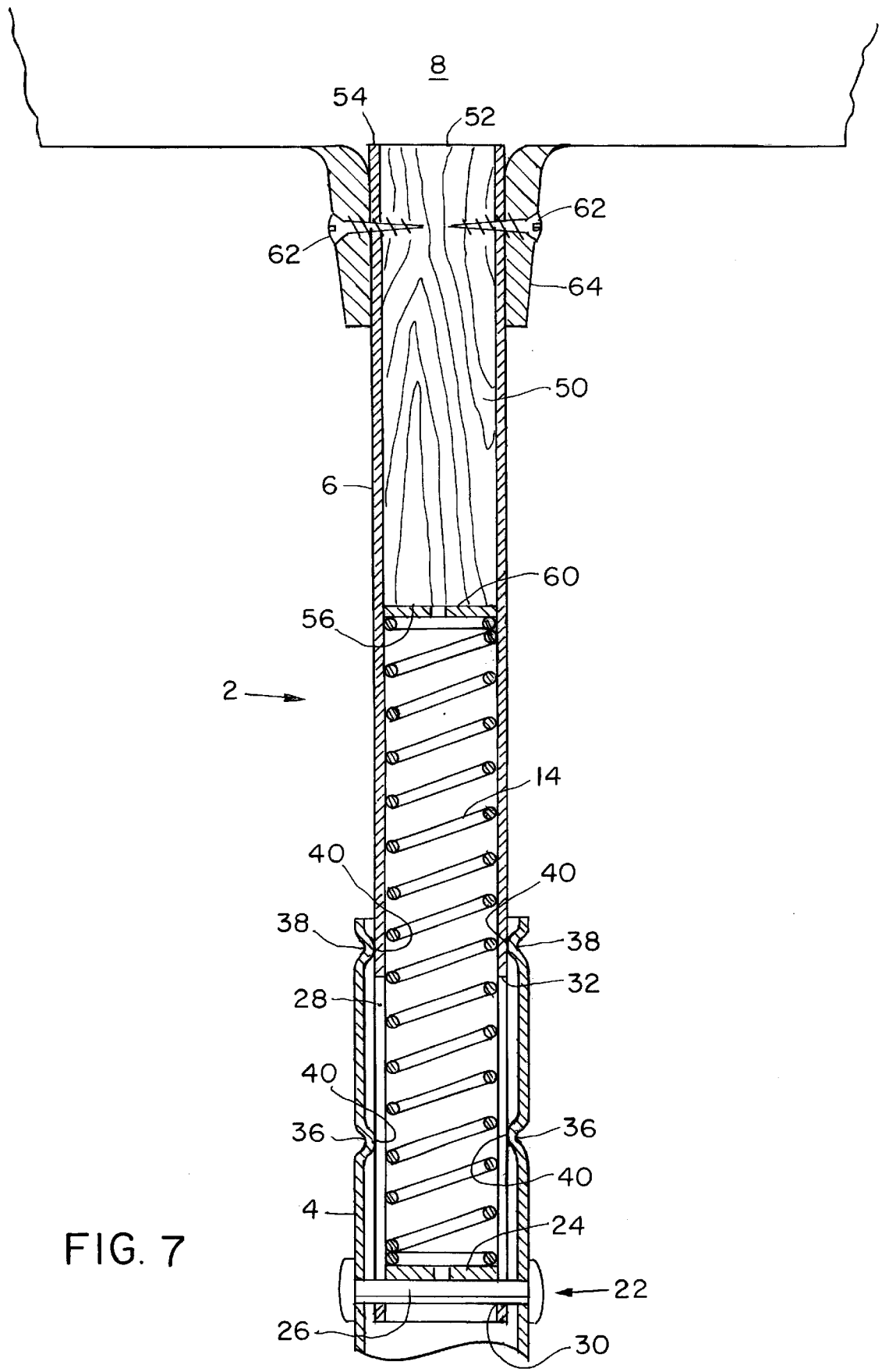
FIG. 7 is a sectional view similar to FIG. 4 disclosing another embodiment of the invention.

An alternative form of the first spring keeper will now be described with reference to FIG. 7. It will be noted that FIG. 7 is shown with the snow blade 8 toward the top of the sheet whereas all other figures show the handle oriented with the blade at the bottom of the sheet. A dowel 50 made of wood or other equivalent material, such as a hard plastic, is forceably inserted into the end of the distal tube 6. When the face 52 is flush with the end 54 of the distal tube 6, the internal face 56 abuts the spring 14. Alternatively, a washer 60 may be employed between the face 56 and the spring 14 to reduce wear on the dowel 50. The length of this dowel and the thickness of the washer 60, if one is used, are intentionally chosen to compress the spring slightly to prevent it from rattling.

With the handle 2 in the FIG. 7 position, the spring 14 is dropped into the distal portion 6 until it abuts the washer 24. If a second washer 60 is chosen to be used, it is dropped into the tube and rests upon the spring 14. Thereafter, the dowel is forced into the tube by press or force-fit and compresses the spring slightly. At least one fastener, shown as screw 62, passes through the hub 64 of the blade 8, the distal tube 6 and into the dowel 50. The screw or screws function to hold the dowel firmly in place and to hold the blade 8 onto the handle. By the use of this construction, the constriction 20 in FIG. 4 is not necessary and the assembly procedure is simplified slightly.

Another embodiment of this invention will now be described with reference to FIGS. 8 and 9. In essence, as will be seen in FIG. 8, the dowel 50 in the distal tube portion 6 is the same as in the FIG. 7 embodiment, being secured therein by the screws 62 or other equivalent fastening members which hold the blade 8 in place. However, the spring 14 in the FIG. 8 embodiment is located in the proximal or wider cross-sectional portion 4 of the tool handle. The distal portion 6 of the tool handle has two ends, one represented by the reference character 54 and the other by reference character 72. The spring may bear directly against the circular end 70 of the distal portion 6 of the tool handle. Preferably, however, a washer 74 bears against the annular surface 70 and the spring 14 bears against the washer. The other end of the spring may bear directly against the end 76 of a dowel 78 or a washer may be interposed therebetween. The dowel 78 is held within the tubular portion 4 by screws illustrated at 80 or by other equivalent fasteners such as power driven nails.

Figures 8, 9:
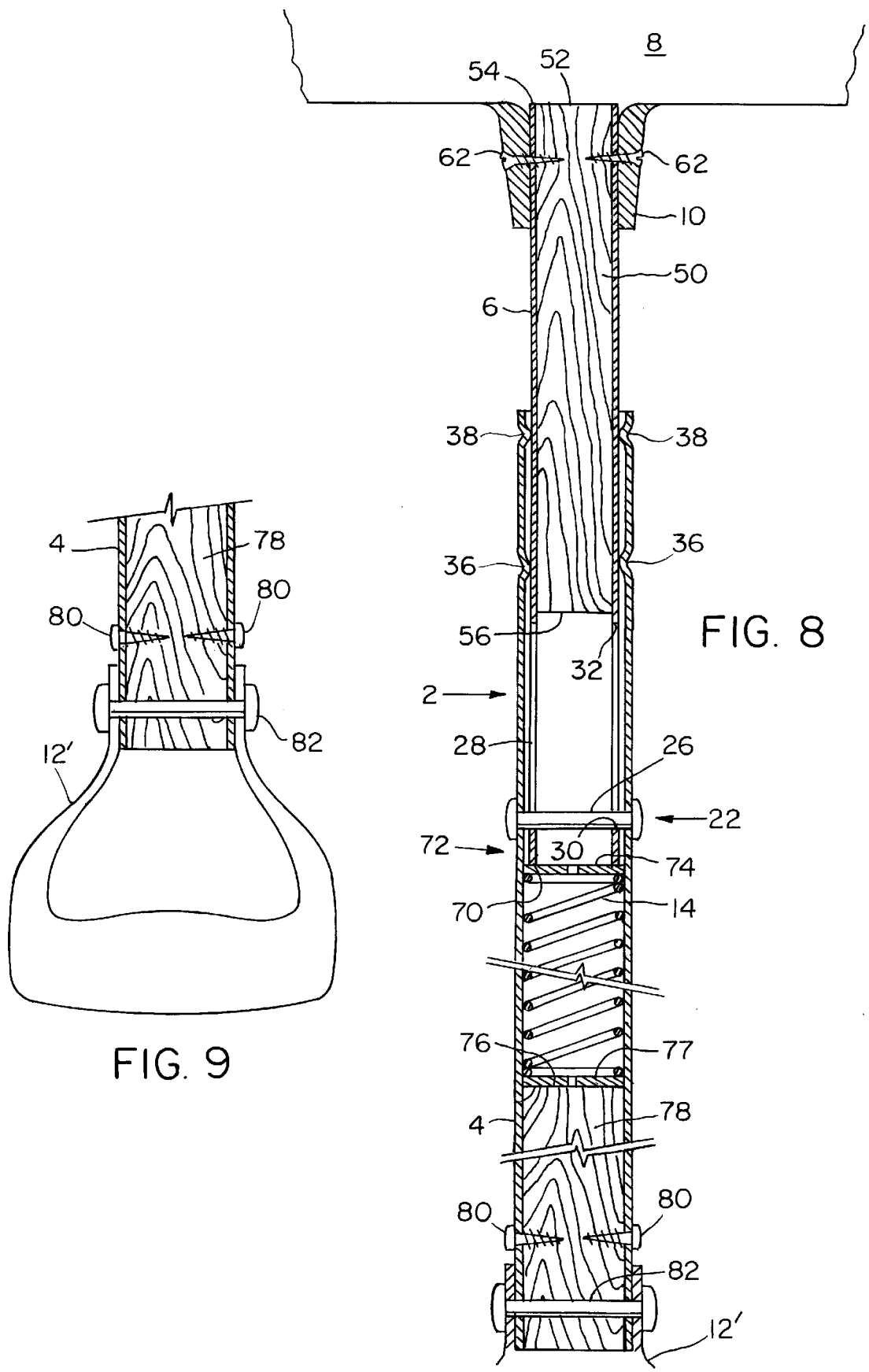
FIG. 8 is a sectional view similar to FIG. 4 disclosing still another embodiment of the invention.
FIG. 9 is a tool handle for the shovel.

A tool handle 12', best seen in FIG. 9, is secured to the end of the tubular portion 4 by a rivet 82 or other like fastener. The rivet 82 may be used to hold, not only the tool handle 12' on the tubular portion, but to hold the dowel 78 inside the tool handle as well.

A benefit in this embodiment of the invention is in ease of assembly. To assemble the spring 14, the tool handle may be held in a vertical position with blade 8 downwardly. If desired, the washer 74 is dropped into place against the annular surface 70, the spring 14 dropped into place and the dowel 78 pressed into the tool compressing the spring slightly. Appropriate fasteners 80 and/or 82 hold the dowel 78 in place.

This embodiment is particularly useful in a tool handle of the type known as a "backsaver" where the handle itself is substantially in the form of a Z. In this instance, the proximal tube portion 4 would be somewhat larger than the distal tube portion 6.

We claim:

1. A shock-absorbing tool handle comprising:

a tubular proximal portion and a tubular distal portion, each portion having two ends;

the distal portion being adapted to receive a tool;

the proximal portion being larger in cross-section than the distal portion and slidable over the distal portion in telescoping relationship toward the tool;

a spring located within the handle, and compressible when the portions telescope toward each other when force is applied in an axial direction;

first and second spring keepers in the handle;

the first spring keeper being one end of the distal portion;

the second spring keeper being a dowel forcibly received in the proximal portion; and guide mechanism in the handle portions positioned to limit the sliding motion between the portions and to permit the spring to be compressed between the keepers when shock is applied to the handle.

2. A tool handle according to claim 1, wherein a washer is positioned between the said one end of the distal portion and the spring.

3. A tool handle according to claim 1, wherein at least one fastener passes into the dowel through the proximal portion to secure the dowel therein.

4. A tool handle according to claim 3, wherein at least one fastener passes into the dowel through the tubular proximal portion to secure a handle grip to thereto.

5. A shock-absorbing tool handle comprising:

a tubular proximal portion and a tubular distal portion, each portion leaving two ends;

the distal portion being adapted to receive a tool;

the proximal portion being larger in cross-section than the distal portion and slidable over the distal portion in telescoping relationship toward the tool;

a spring located within the proximal portion of the handle, and compressible when the portions telescope toward each other when force is applied in an axial direction;

a first spring keeper in the proximal portion and a second spring keeper engagable with the proximal portion;

the first spring keeper being one end of the distal portion;

the second spring keeper being a dowel forcibly received in the proximal portion; and at least one wiper in the handle surrounding the distal portion and engagable with the proximal portion to prevent the entry of contaminants between the telescoping portions.

6. A tool handle according to claim 5, wherein a washer is positioned between the said one end of the distal portion and the spring.

7. A tool handle according to claim 5, wherein at least one fastener passes into the dowel through the proximal portion to secure the dowel therein.

8. A tool according to claim 5 wherein at least one fastener passes into the dowel through the tubular proximal portion to secure a handle grip thereto.

9. A tool handle according to claim 5, wherein the wiper is an annular projection in the proximal portion engagable with the distal portion.

10. A tool handle according to claim 5, wherein the wiper is an O-ring of low friction plastic material carried by the proximal portion and engagable with the distal portion.

* * * * *